J. C. BEAUMONT.
Velocipede.
No. 91,702.
Patented June 22, 1869.
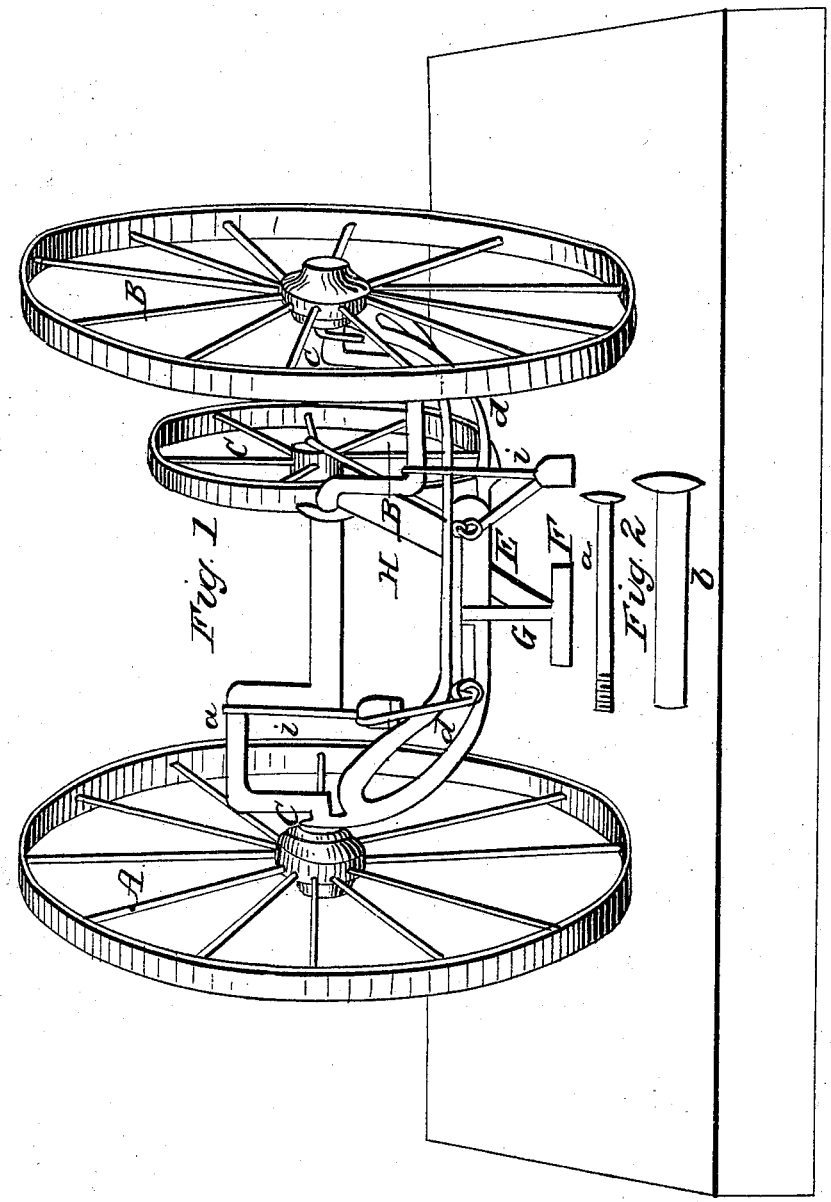
Witnesses
D. C. Cooley
R. N. Dunlap
Inventor
J C Beaumont

United States Patent Office.

JOHN C. BEAUMONT, OF WILKESBARRE, PENNSYLVANIA.

Letters Patent No. 91,702, dated June 22, 1869.

---

IMPROVEMENT IN VELOCIPEDE.

---

The Schedule referred to in these Letters Patent and making part of the same.

---

*To all whom it may concern:*

Be it known that I, JOHN C. BEAUMONT, of the borough of Wilkesbarre, county of Luzerne, and State of Pennsylvania, have invented a new and useful Improvement in Velocipedes, said improved velocipede to be called "The Gazelle;" and I do hereby declare that the following is a full, clear, and exact description of the construction and operation of the same, reference being had to the annexed drawing, making a part of this specification, in which—

Figure 1 is a perspective view of the entire vehicle, and

Figure 2, a plan view of the two parts of the swivel-axle detached.

I construct said improved velocipede in the manner following, to wit:

I use three wheels, the two front or forward wheels A B, which serve for drivers, and the hind wheel C, fig. 1.

The wheels A B are united by and permanently fixed on a swivel-axle, in two detachable parts $a$ $b$, as shown united in fig. 1, and detached in fig. 2, said axle being constructed as follows:

One part (say $a$) is an iron rod, bent and returned at a short distance from the hub, in which it is fixed, so as to form a crank of the desired length and width, and then extended to the length of the desired distance between the two cranks on said axle.

The other part $b$ of said axle is a similar rod, bent and returned near the other hub, in which it is fixed, so as to form a similar crank to that on $a$, but, instead of being extended like $a$, is cut off at the end of the return, and braced or otherwise firmly fixed to the end of a tube of nearly the length of the extended part of $a$.

Inside such tube are fixed suitable bearings at the ends thereof, in which the extended part of $a$, serving as a gudgeon, freely revolves, when the two parts $a$ and $b$ are united; the same being held together by means of a burr on the end of the extended part $a$, and so that, by means of the cranks, both or either of the wheels A B can be moved at the pleasure of the rider.

By means of friction-plates attached to the returned end of the crank on $a$, and the free or outer end of the tube on $b$, respectively, and operated by a thumb-screw in the plate on $b$, or otherwise, the two parts of the axle may be readily united so as to move together, or separated, at the will of the rider.

Suspended from the axle, at the parts between the cranks and hubs of the wheels, by means of detachable hooks $c$ $c$, are curved rods, united at the hooks, but separated and spread apart below, so as to form two loops or slings $d$ $d$, on which a properly-formed seat-board, $e$, is placed, said hoops or slings being sufficiently low to enable the rider to sit easily beneath the axle.

A rod attached to said seat, and extending forward at an angle downward, supports a foot-board, $f$, and upright or stanchion $g$, to support a lamp and the stirrups, hereinafter mentioned.

By means of a pivot through the front of said seat-board, a coupling-rod, $h$, is attached underneath said seat, and running through a guide-slot arranged at the rear of said seat, and fixed thereto, extends back so as to embrace and hold said hind wheel in the slot or division of said coupling-rod, by the projecting pivots or gudgeons of said wheel, said wheel being of a less dimension than the fore wheels.

Supported from the stanchion on the foot-board, hang two stirrups $i$ $i$, by straps. Straps also connect these stirrups to rings or bands, about the handles of the cranks.

The said improved velocipede is operated and propelled in the manner following, to wit:

By means of the detachable hooks $c$ $c$, the rider is enabled to easily assume the seat, and by means of the cranks and stirrups $i$ $i$, he may propel the vehicle by both hands and feet at the same time.

The turning of corners is effected by moving the crank of the outside wheel faster than the other, the cranks serving both to guide and propel the vehicle. On a straight course the axles may be united by the friction-plates, so as to prevent the vacillating or wabbling movement caused by the alternate action of the separate cranks.

I disclaim the invention of any part or appliances belonging to said hereinbefore-described velocipide, except as hereinafter expressly claimed; but What I do claim as new, and as my invention, and desire to secure by Letters Patent, is as follows:

The swivel-axle, furnished with friction-plates, for the purpose of uniting or disconnecting the motions of the two parts of said axle, and so as to both guide and propel said improved velocipede at the same time by means of the two cranks, as hereinbefore set forth.

J. C. BEAUMONT.

Witnesses:
    D. C. COOLEY,
    R. H. DUNLAP.